(12) United States Patent
Olsen

(10) Patent No.: US 8,845,412 B2
(45) Date of Patent: Sep. 30, 2014

(54) MYSTERY-BINGO JACKPOT WITH INCREASED PAYOUT FREQUENCY

(71) Applicant: Eric B. Olsen, Henderson, NV (US)

(72) Inventor: Eric B. Olsen, Henderson, NV (US)

(73) Assignee: Olsen Gaming Inc., Las Vegas, NV (US)

( * ) Notice: Subject to any disclaimer, the term of this patent is extended or adjusted under 35 U.S.C. 154(b) by 85 days.

(21) Appl. No.: 13/733,528

(22) Filed: Jan. 3, 2013

(65) Prior Publication Data

US 2013/0244747 A1 Sep. 19, 2013

Related U.S. Application Data

(63) Continuation-in-part of application No. 13/324,964, filed on Dec. 13, 2011, now Pat. No. 8,636,578.

(51) Int. Cl.
- A63F 9/24 (2006.01)
- A63F 13/00 (2014.01)
- A63F 3/06 (2006.01)
- G07F 17/32 (2006.01)

(52) U.S. Cl.
CPC .............. *A63F 3/0645* (2013.01); *A63F 9/24* (2013.01); *A63F 13/00* (2013.01); *G07F 17/3267* (2013.01); *G07F 17/3258* (2013.01)

USPC ............... 463/19; 463/16; 463/26; 463/42; 273/269; 273/139

(58) Field of Classification Search
None
See application file for complete search history.

(56) References Cited

U.S. PATENT DOCUMENTS

| | | | |
|---|---|---|---|
| 7,481,707 B1 * | 1/2009 | Luciano et al. | 463/19 |
| 7,874,907 B2 * | 1/2011 | Lozano et al. | 463/19 |
| 7,946,915 B2 * | 5/2011 | Cannon | 463/19 |
| 7,959,509 B2 * | 6/2011 | Saffari et al. | 463/27 |
| 8,192,279 B2 * | 6/2012 | Saffari et al. | 463/27 |
| 2005/0059467 A1 * | 3/2005 | Saffari et al. | 463/19 |
| 2009/0011814 A1 * | 1/2009 | Lozano et al. | 463/19 |
| 2012/0088576 A1 * | 4/2012 | Shepherd et al. | 463/26 |

* cited by examiner

*Primary Examiner* — William Brewster
*Assistant Examiner* — Alex F. R. P. Rada, II
(74) *Attorney, Agent, or Firm* — Lightbulb IP, LLC

(57) ABSTRACT

A mystery-bingo jackpot having increased payout opportunities provides a dynamic bonus game where achievement of a secondary winning outcome initiates an award payout without resetting the jackpot's amount. The secondary winning outcome will typically be configured to have a higher likelihood of occurrence as compared to other winning outcomes of the mystery-bingo jackpot. In this way, the mystery-bingo jackpot provides payouts relatively often while preserving the value of the jackpot.

20 Claims, 10 Drawing Sheets

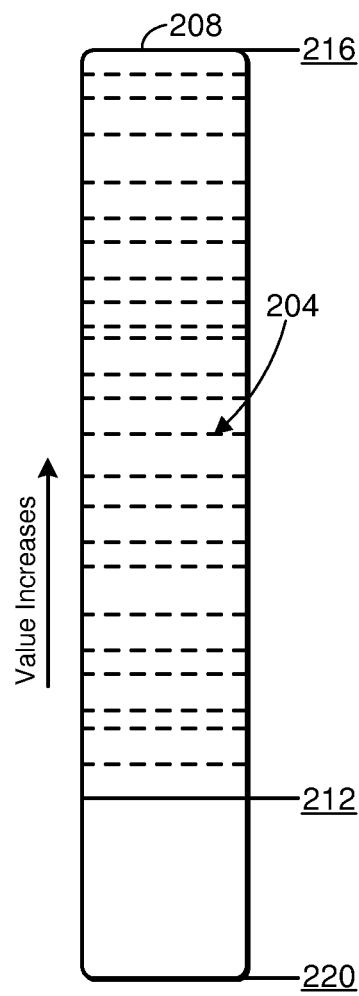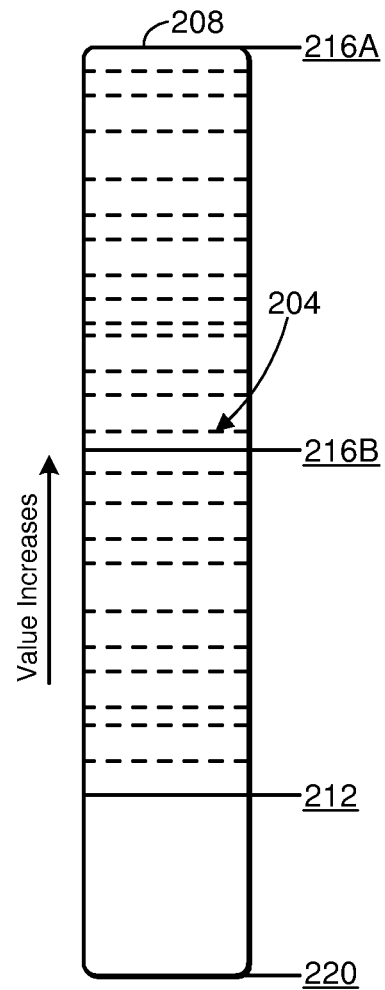

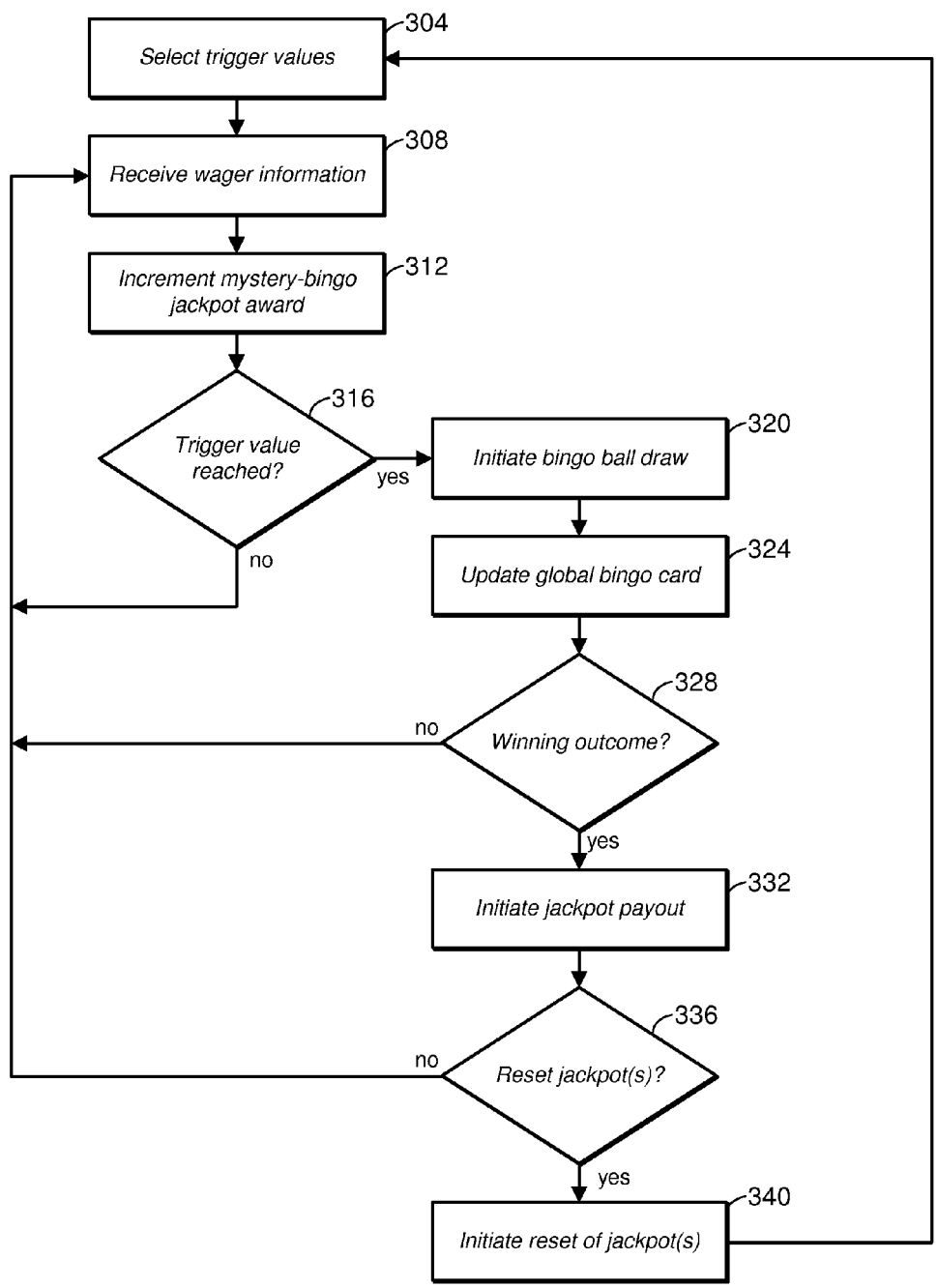

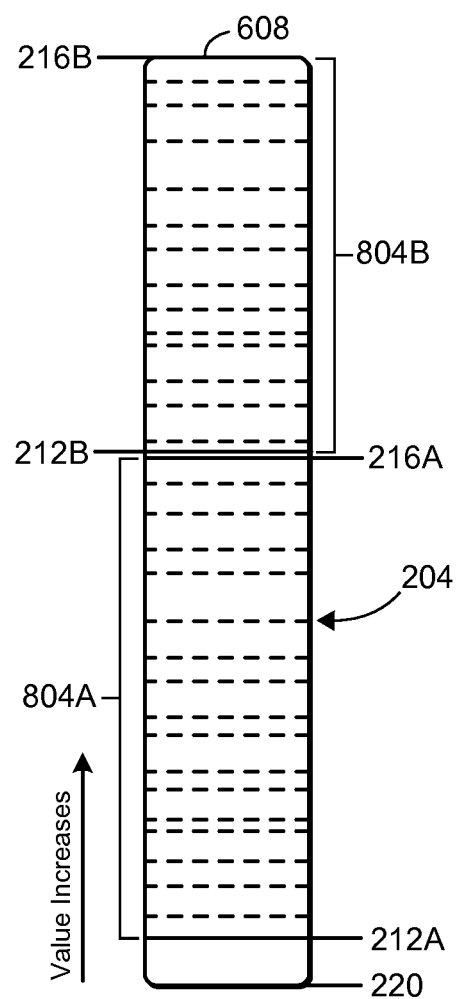

MYSTERY-BINGO JACKPOT WITH INCREASED PAYOUT FREQUENCY

CROSS-REFERENCE TO RELATED APPLICATION

This application is a continuation-in-part of U.S. patent application Ser. No. 13/324,964, titled Mystery Jackpot with Bingo Game Trigger, filed Dec. 13, 2011.

BACKGROUND OF THE INVENTION

1. Field of the Invention

The invention relates to jackpot systems and in particular to a mystery jackpot with a bingo type trigger.

2. Related Art

A jackpot or bonus award is often used to both reward and entice players to wager at one or more base games. The base games may be various wagering games, such as slot games or card games. The jackpot or bonus is generally provided to a player of a base game when the player meets a particular criteria at the base game, such as by wagering a particular amount and achieving a particular game outcome.

Various types of jackpots or bonuses exist. One type of jackpot or bonus is known as a progressive jackpot. Progressive jackpots are traditionally driven by occurrences at their associated base games. For example, traditional jackpots are typically funded by the wagers received by their base games, and the payout of these jackpots are based on the game outcomes achieved at the base games.

As such, such jackpots are limited by the base games to which they are associated. To illustrate, a traditional progressive jackpot might be associated with Class-III gaming machines, such as reel-type slot machines. Thus, in this exemplary case, funding and jackpot payout would occur based on the operation of a Class-III game.

From the discussion that follows, it will become apparent that the present invention addresses the deficiencies associated with the prior art while providing numerous additional advantages and benefits not contemplated or possible with prior art constructions.

SUMMARY OF THE INVENTION

A mystery-bingo jackpot with increased payout opportunities is disclosed herein. The mystery-bingo jackpot may utilize a bingo game as its triggering mechanism to allow for use in Class-II gaming jurisdictions. The mystery-bingo jackpot provides secondary winning outcomes that allow the frequency of payouts to be increased while preserving awards for primary winning outcomes.

The mystery-bingo jackpot may have various configurations. For example, in one embodiment, a mystery-bingo jackpot controller is disclosed. Such mystery-bingo jackpot controller may comprise one or more storage devices storing a plurality of primary winning outcomes associated with a primary award amount and comprising at least a number of bingo balls, a secondary winning outcome associated with a secondary award amount and having fewer than the number of bingo balls, and a range having a lower limit and an upper limit. One of the primary winning outcomes will typically be identified as a particular primary winning outcome.

The mystery jackpot controller may also include one or more random number generators configured to generate a plurality of trigger values within the range, and one or more processors. The processors may be configured to increment the primary award amounts a particular amount, update a global bingo card with a random bingo ball number when at least one primary award amount meets or exceeds one of the plurality of trigger values, and compare the updated global bingo card to the plurality of primary winning outcomes (including the particular primary winning outcome) and to the secondary winning outcome.

The processors will typically also initiate a payout when the updated global bingo card contains at least one of the plurality of primary winning outcomes or the secondary winning outcome, adjust the range upward only when the updated global bingo card contains the secondary winning outcome, and reset the plurality of primary award amounts to a base value only when the updated global bingo card contains at least one of the plurality of particular primary winning outcomes. One or more new trigger values are typically generated within the adjusted range by the random number generators after the range is adjusted upward.

It is noted that the processors may adjust the range upward by increasing at least a lower limit of the range, by increasing an upper limit of the range, or both. The processors may pay both a primary award amount and the secondary award amount when the updated global bingo card contains at least one of the plurality of primary winning outcomes and the secondary winning outcome. Also, in operation, a bingo ball number may be associated with each of the plurality of trigger values, and in such case the drawn bingo ball number is the bingo ball number associated with the one of the plurality of trigger values that is met or exceeded.

One or more communication devices configured to receive wager information from a plurality of gaming machines may be included as well. In general, the wager information indicates the particular amount to increment the jackpot award amount. In addition a display configured to present at least the global bingo card to a plurality of players may be provided.

In another exemplary embodiment, a mystery-bingo jackpot controller may comprise a plurality of primary winning outcomes comprising a plurality of bingo ball numbers, each of the plurality of primary winning outcomes having an associated primary winning amount, and one or more secondary winning outcomes comprising one or more bingo ball numbers. At least one of the primary winning outcomes is typically identified as a particular primary winning outcome, while each of the secondary winning outcomes typically has an associated secondary winning amount. The secondary winning outcomes are typically distinct from the plurality of primary winning outcomes.

The mystery-bingo jackpot controller may also include one or more random number generators configured to generate a plurality of bingo ball numbers, and one or more processors. The processors may be configured to increment at least one of the primary winning amounts a particular amount according to one or more increment rates, update a global bingo card with a bingo ball number from the random number generators, and initiate payout of a primary winning amount if the updated global bingo card contains at least one of the plurality of primary winning outcomes. The plurality of primary award amounts are typically reset to a base value if the updated global card contains the particular primary winning outcome. A payout of the secondary winning amount is then initiated if the updated global bingo card contains at least one of the secondary winning outcomes.

It is contemplated that the secondary winning outcomes may have fewer bingo balls than the plurality of primary winning outcomes. Also, the secondary winning amounts may be constant. For example the secondary winning amounts may be held constant until the mystery-jackpot bingo game is restarted. In addition, one or more communication devices may be configured to receive wager information from a plurality of gaming machines, with the wager information indicating the particular amount to increment the jackpot award amount.

The plurality of bingo balls in the secondary winning outcomes may be randomly selected by the random number generators. In addition, the number of bingo balls in the secondary winning outcomes may be adjustable via one or more input devices.

It is noted that the processors are configured to determine an estimated payout amount for each of the plurality of primary winning outcomes based on the number of bingo balls. A large-format display may be provided to present the global bingo card and the secondary winning outcomes to a plurality of players.

Various methods related to the mystery-bingo jackpot herein are also disclosed. For example, in one embodiment, a method for awarding a jackpot with a mystery-bingo jackpot controller is provided. Such method may comprise defining a secondary winning outcome comprising one or more bingo ball numbers, receiving wager information via a communication device in communication with a plurality of gaming machines, the wager information identifying an increment value, and incrementing at least one jackpot award associated with at least one of the plurality of primary winning outcomes by the increment value. The secondary winning outcome is typically distinct from a plurality of primary winning outcomes of the jackpot;

The method may also include marking a randomly obtained bingo ball number on a global bingo card, initiating a payout if the global bingo card contains at least one of plurality of primary winning outcomes, the secondary winning outcome, or both, and resetting the jackpot award to a base value and clearing the global bingo card if the global bingo card contains a particular predefined outcome. The particular predefined outcome will typically be one of the plurality of primary winning outcomes.

It is noted that the secondary winning outcome may have fewer bingo balls as compared to the plurality of primary winning outcomes. In addition, a number of bingo ball numbers in the secondary winning outcome may be adjustable via an input device of the mystery jackpot controller. The secondary winning outcome may be user-defined as well. The global bingo card may be presented to a plurality of players via a large-format display.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 2A is a block diagram illustrating an exemplary mystery-bingo jackpot;

FIG. 2B is a block diagram illustrating an exemplary mystery-bingo jackpot;

FIG. 3 is a flow diagram illustrating operation of an exemplary mystery-bingo jackpot system;

FIG. 8 is a block diagram illustrating an exemplary mystery-bingo jackpot.

DETAILED DESCRIPTION OF THE PREFERRED EMBODIMENTS

Figure 1A:
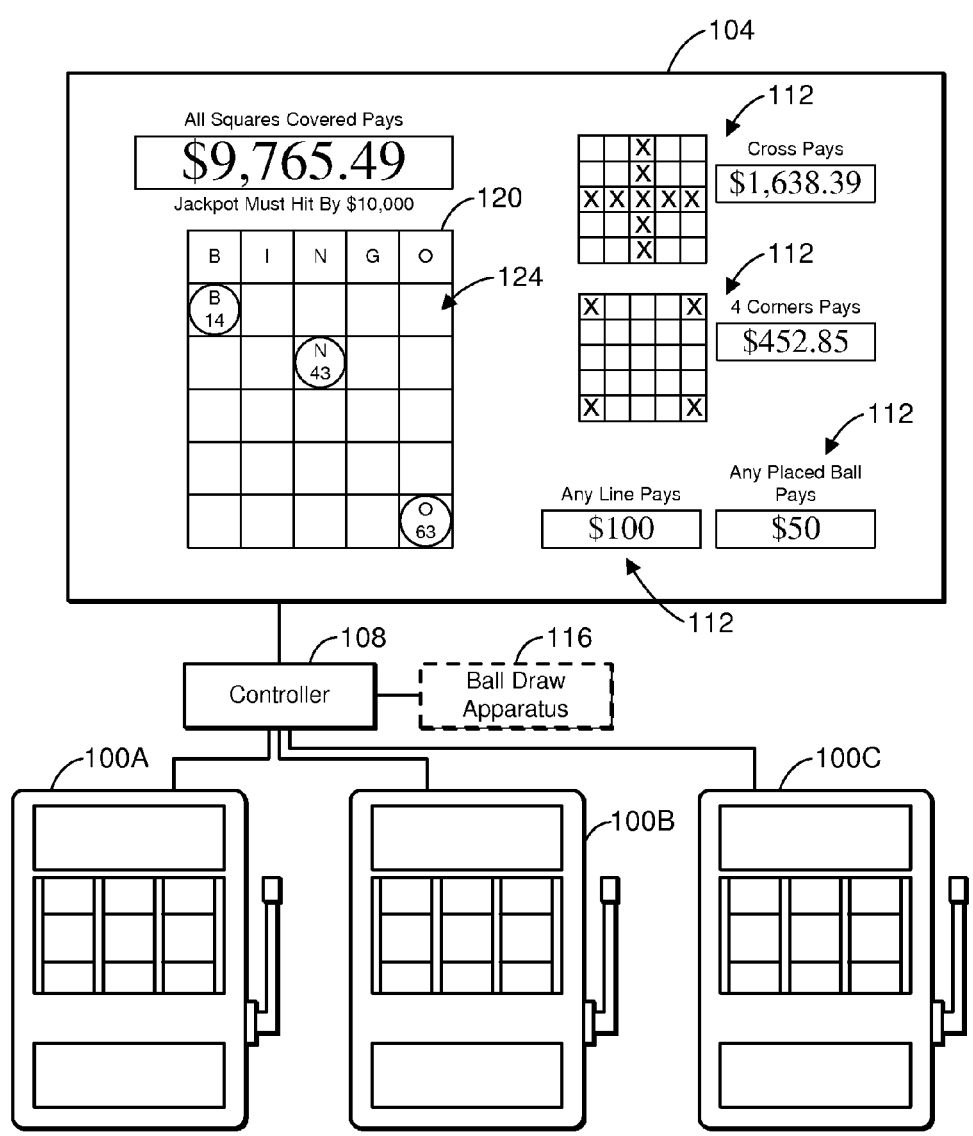
FIG. 1A is a block diagram illustrating an exemplary mystery-bingo jackpot system.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the mystery jackpot with bingo game trigger (hereinafter "mystery-bingo jackpot") disclosed herein utilizes a unique triggering mechanism to determine jackpot winners, while preserving the benefits of mystery jackpots. Namely, the mystery-bingo jackpot may utilize a bingo game as its triggering mechanism to award the jackpot. This is advantageous in that players participate in not just a base wagering game, but also a bingo game for the jackpot award. This adds to the excitement and enticement of the wagering game and provides a bonus award, should the player win the mystery-bingo jackpot.

There are numerous gaming jurisdictions where only Class-II gaming is permitted. Class-II wagering games are based on traditional games, such as lottery and bingo. The mystery-bingo jackpot's use of a Class-II wagering game (e.g., bingo) as a triggering mechanism is thus another advantage in that it allows the mystery-bingo jackpot to be used in such jurisdictions. In addition, as will be described in the following, the mystery-bingo jackpot can, in some embodiments, provide the enticement and excitement of a "must hit by" value and, in other embodiments, provide the enticement and excitement of increasing jackpots with frequent payouts for secondary winning outcomes.

A traditional bingo game is random, and as such, provides no certain way to determine, or even control, when a winning outcome will be achieved. The ability to post an upper limit is impossible without modifying the probabilities of the underlying bingo game (which could be done in some embodiments of the mystery-bingo jackpot). However, modifying the probabilities of bingo means it is no longer the game of bingo, and therefore may not be deemed legal for Class-II gaming.

The mystery-bingo jackpot will now be described with regard to FIGS. 1A-1B. In general, and as will be described further below, the mystery-bingo jackpot may reward players at its base games with bingo ball draws to fill in the global bingo card 120. The player that causes the global bingo card 120 to have a winning outcome will win the award associated with that outcome.

As can be seen, the mystery-bingo jackpot may offer a "must hit by" value or limit. This is because the mystery-bingo jackpot's awards may be configured such that they pay out randomly and before a predefined upper limit is reached, as will be described further below. This is advantageous in that it allows the upper limit to be known to players and to be published for players. This also drives increased play at base games as players realize a jackpot is about to be awarded.

The mystery-bingo jackpot system may have various configurations. For instance, as shown, the mystery-bingo jackpot system comprises a controller 108 and a display 104. The mystery-bingo jackpot system could also include or be in communication with one or more gaming machines 100, where its base games may be played. It will be understood that communication by the mystery-bingo jackpot system may occur through various communication networks and links, including the Internet. This allows a single mystery-bingo jackpot to service a plurality of remote gaming establishments.

In one or more embodiments, the display 104 may be a public display configured to present mystery-bingo jackpot status, awards, winning outcomes, and other information. The display 104 may have an increased size to make such information readily visible. It is noted that there may be a plurality of displays 104 mounted throughout a gaming establishment. In addition, the display 104 or information thereon may be represented electronically, such as by being presented on individual gaming machines or devices.

Figure 1B:
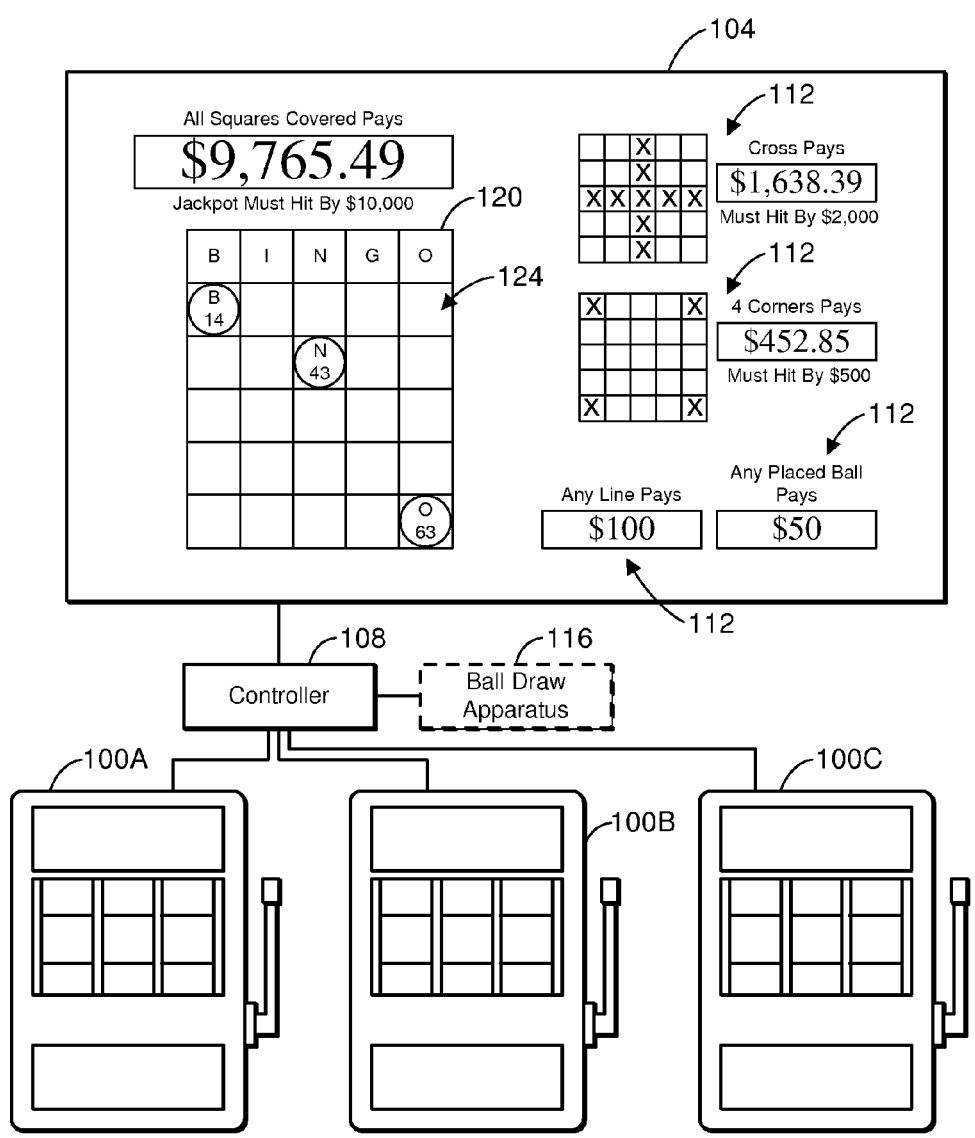
FIG. 1B is a block diagram illustrating an exemplary mystery-bingo jackpot system.

The exemplary display 104 of FIGS. 1A-1B illustrate the information that may be presented to players. As can be seen, various jackpot award amounts, including that of the mystery-bingo jackpot, may be shown along with an associated winning outcome. This is to notify players what they will win if they achieve one of the winning outcomes. For example, "all squares covered" would pay a mystery-bingo jackpot award of $9,765.49, a "cross" pays a progressive award of $1,638.39, and "four corners" pays a progressive award of $452.85. It is noted that other awards may be presented (and paid out) as well. For instance, as shown, achieving an "any line" outcome may pay a fixed award of $100, while an "any placed ball" outcome may pay a fixed award of $50.

As can also be seen, the winning outcomes may be shown and/or described in text or with representative bingo cards 112. A "must hit by" value may also be presented to indicate to players the upper limit of a mystery-bingo jackpot. It is noted that this also helps indicate that the jackpot is a mystery-bingo jackpot. In addition, the number of various jackpots offered, the amount of the jackpot(s), and the number and placement of previously drawn balls may be shown on the display 104 in some embodiments.

The display 104 will generally depict bingo cards in a 25 square arrangement, such as shown. It is contemplated that other configurations could be used as well. For example, square, rectangular or other shaped configurations may be used. In addition or alternatively, fewer or additional squares or spots 124 may be provided. A global bingo card 120 may show the current state of a mystery-bingo jackpot, such as by showing which spots 124 on the global bingo card have been marked. Players can compare the global bingo card 120 to winning outcomes to determine how close or if the jackpot has been won. The global bingo card 120 reveals the status of the mystery-bingo jackpot in this manner.

The display 104 itself may comprise one or more electronic displays, such as LCD, OLED, LED, or other screens. This allows information on the display 104 to be easily changed. For instance the jackpot award amounts, the state of the global bingo card, and the winning outcomes may be changed automatically as events occur. It is contemplated that separate electronic screens or displays may be used to present various jackpot award amounts, must hit by values, winning outcomes, representative bingo cards 112, or the global bingo card 120. Previous jackpot payouts may be presented as well. For example, a previously paid jackpot could be presented by its payout about and a "jackpot paid" or similar notification on the display 104. In some embodiments, the representative bingo cards 112 may display which spots 124 need to be covered to win and indicate which of those spots have already been covered (or not covered).

Portions of the display 104 could be static in some embodiments. For example, in one embodiment, only the global bingo card 120 and progressive award amounts may be presented via an electronic display, with the other mystery-bingo jackpot information being displayed statically such as by being printed on a portion of the display 104. It is contemplated that in lieu of an electronic displays one or more mechanical display apparatuses could be used, such as to rotate numbers or other information into and out of view.

The display 104 may be in communication with the mystery-bingo jackpot system's controller 108 in one or more embodiments. In this manner, information on the display 140 may be updated by the controller. For example, the status of the global bingo card 120 may be updated as bingo balls are drawn. In addition, announcements of jackpot winnings, changes to progressive award amounts, or changes to winning outcomes may be updated by the controller 108. Since the controller 108 may be in communication with the gaming machines 100, this information may be updated in real time or near real time. To illustrate, an award amount for a winning outcome may be increased as wagers are accepted at one or more of the gaming machines 100.

As alluded to above, the mystery-bingo jackpot controller 108 may control or operate one or more mystery-bingo jackpots, as well as fixed, progressive or other jackpots if desired. As will be detailed below, the controller 108 may receive input from base games and other sources and provide various outputs, such as output indicating the value of one or more jackpot awards, the current state of the global bingo card, and whether a winning outcome has been achieved.

The mystery-bingo jackpot controller 108 may support an input/output control function through which the jackpot's configuration and settings may be made or modified. For example, a base value, a lower limit and an upper limit may be set by the operator for each mystery-bingo jackpot offered. In general, the low and upper limit will define the range between which a mystery-bingo jackpot may be awarded. If the amount of a particular mystery-bingo jackpot is not within this range, then the mystery-bingo jackpot may not be awarded in one or more embodiments. In addition, as will be described further below, the mystery-bingo jackpots provided by the mystery-bingo jackpot system will typically always be awarded before the upper limit of a particular jackpot is reached. This preserves the characteristics of a mystery jackpot while incorporating a bingo game trigger.

The base value may be an amount that a jackpot may be set to after it has been paid out. This amount may be zero but will typically be an amount larger than that to entice further play at the mystery-bingo jackpot's base games.

The operator may also set other parameters such as increment rate, which is the amount contributed to a jackpot from each wager. Each mystery-bingo jackpot may have its own increment rate or may share the same increment rate. It is contemplated that input and output may occur through various user interface devices such as keyboards, buttons, switches, pointing devices, touch screens, and display screens. In addition, in some embodiments, the controller 108 may have a network or other communication interface to allow configuration from a remote terminal or other external device.

In one or more embodiments, the parameters might include selection or configuration of winning outcomes. For example, the operator may select from a plurality of awards (bingo outcomes) to configuring the mystery-bingo jackpot. The mystery-bingo jackpot system may generate a selection of awards for the operator to select from. The ability to select in this manner is beneficial in that it allows the operator to create its own games.

It is contemplated that the controller 108 may provide the mystery-bingo jackpot to one or more remote players in some embodiments. In such embodiments, one or more communication devices of the controller 108 may be configured to communicate over various networks, including the Internet, to allow the controller 108 to be accessible from virtually any location. In one exemplary embodiment, the controller 108 may be configured to present the mystery-bingo jackpot on a remote display, such as on a display screen of a gaming machine 100 or other gaming device. For example, the controller 108 may present the mystery-bingo jackpot on a smartphone, laptop computer, tablet, PDA, media player, smart TV, desktop computer, or other electronic device. It is contemplated that wager information for incrementing the mystery-bingo jackpot may be received from wagering games being played on such devices wherever they may be located.

FIGS. 2A-2B illustrate mystery-bingo jackpots 208 as a vertical bar. As a mystery-bingo jackpot 208 is incremented (i.e., funded) its value increases from the bottom to the top of the vertical bar, where there may be an upper limit 216. FIGS. 2A-2B show a base value 220, lower limit 212 and upper limit 216 of exemplary mystery-bingo jackpots 208 for instance.

In one embodiment, the controller 108 may be configured to select up to 75 values between the lower limit 212 and upper limit 216. These values will typically be randomly selected. There may be fewer or additional values selected by the controller 108, such as to ensure that a winning outcome occurs (and the jackpot paid out) before an upper limit 216 of the mystery-bingo jackpot 208 is reached. This may depend on the number of spots present on the global bingo card. In some embodiments, such as shown in FIG. 2B, the number of trigger values 204 may be set to ensure each of multiple mystery-bingo jackpots 208 is awarded before their respective upper limit 216A,216B is reached.

As the name implies, each trigger value 204, may be a trigger that causes a bingo ball to be drawn. In one embodiment, a specific bingo ball number (which may include a letter) may be randomly assigned to each of the 75 trigger values 204 chosen by the controller 108. When the jackpot pool meets or exceeds any of the trigger values 204 as a result of a player's wager, that player wins a ball draw. If the associated bingo ball number is present on the global bingo card 120, that spot on the global bingo card may be marked. For example, a bingo ball graphic or other representation may be positioned in the spot to indicate that it has been marked.

Alternatively, instead of assigning bingo ball numbers to the trigger values 204, it is contemplated that the controller 108 may randomly choose from an available pool of remaining bingo balls when the jackpot pool increases such that it meets or exceeds one of the trigger values. In this case too, a spot on the global bingo card 120 may be marked if such spot matches the number of the drawn bingo ball. In some embodiments, an actual physical bingo ball draw may occur. In other embodiments, the bingo ball draw may be performed electronically, such as by using a random number generator of the mystery-bingo jackpot controller 108 or other gaming device to randomly select a bingo ball.

In one or more embodiments, the ball draw may be made with a great deal of player fan fare, such as by providing one or more visual and or audio presentations. For example, the base game may be suspended, and the player may be asked to initiate the bingo ball draw using a button, touch screen, or other input. In one embodiment, the process of activating the bingo ball draw may be transformed into a player choice. For example, a video game screen may be populated with a set of pictures, symbols or icons, and the player then chooses from the set of symbols which mask, or hide, the actual ball draw choice, but provides a means of choice by the player. In another embodiment, the player may actually choose from a limited set of actual balls, or all balls, for instance (i.e., an unmasked option).

It is contemplated that, a smaller progressive or fixed prize could be awarded when any ball draw opportunity is awarded. In one embodiment, the summation of fixed prizes is counted towards (i.e., summed with) base jackpot value when determining the payback of the system. This adds to the fanfare of obtaining a ball draw. In addition, one or more of the ball draw events (i.e., trigger values) can be associated with mid-sized cash awards, or other special bonuses. This means the ball draw event itself can be associated with the possibility of receiving a mid-sized bonus payment.

The trigger values 204 may be distributed in various ways. As stated the trigger values 204 may be randomly selected between a lower limit 212 and one or more upper limits 216. Typically, the trigger values 204 will be distributed within each set of lower and upper limits 212,216 such that a winning outcome occurs before each upper limit 216 is reached.

Each trigger value 204 may be used in succession towards completion of a winning outcome on the global bingo card. This occurs as the mystery-bingo jackpot's value increases due to funding from wagers placed at its base games. As the value of the mystery-bingo jackpot increases to meet or exceed each triggering value 204, a new bingo ball may be drawn. As bingo balls are drawn, the global bingo card 120 becomes filled. A winning outcome will be obtained as this process continues.

The player whose ball draw completes a winning outcome will be awarded an associated mystery-bingo jackpot award. A bonus pay signal may be transmitted from the controller 108 to the winning player's base game (such as at a gaming machine 100) to notify the player of his or her jackpot win. The controller 108 may then reset the mystery-bingo jackpot by resetting the amount of the jackpot to a pre-determined base value 220. The controller may then randomly select 75 trigger values for the next jackpot. In cases where multiple upper limits 216 are provided, such as shown in FIG. 2B, the mystery-bingo jackpot 208 need not be reset until a jackpot award associated with the largest upper limit 216 is awarded.

In one embodiment, a bingo game outcome may require up to 25 specific balls (such as to cover a 5×5 global bingo card 120), which in most cases, will likely occur after a number of ball draws. This means the jackpot would tend to be awarded later in the progressive jackpot cycle. However, a winning outcome will be guaranteed to occur before the jackpot award reaches the "must hit by" amount (i.e., the upper limit 216), since all ball draw triggers are selected by the controller 108 to occur before the jackpot amount reaches the upper limit 216.

This allows the display 104 to prominently show that the progressive jackpot "must hit by" a particular upper limit 216. Players will then be aware that, in many cases, the jackpot will nearly reach the upper limit 216, but will always be awarded before it does. In this manner, the mystery-bingo jackpot is as effective in enticing players to its base game as a traditional mystery jackpot, while being triggered by a game of bingo (or other Class-II game).

The mystery-bingo jackpot may support a single mystery-bingo jackpot or multiple mystery-bingo jackpots (along with various other progressive or fixed jackpots if desired). Referring back to FIG. 1A for example, a single shared global bingo card 120 and single set of shared bingo balls are used to provide a single mystery-bingo jackpot for the "all squares covered" winning outcome. This can be seen by the fact that the "all squares covered" outcome is the only one with a "must hit by" value.

It is noted that the largest progressive award may be associated with the least likely winning outcome, which in this example is the "all squares covered" outcome. With the mystery-bingo jackpot, because all bingo ball selections are typically triggered before the progressive jackpot reaches an upper limit, (which is set to $10,000 in the example of FIG. 1A) the mystery-bingo jackpot is guaranteed to be awarded before it hits $10,000.

The other two progressive jackpots shown in FIG. 1A (for a "cross" or "four corners" winning outcome) do not have a "must hit by" value in this example. This means they may hit at any time, though will hit prior to or at the same time as the "all squares covered" outcome since the "all squares covered" outcome requires all of the global bingo card's spots 124 to be marked.

Two fixed jackpots are also offered in the example of FIG. 1A. A first for any line outcome (forming a line of balls, either horizontal or vertical), and a second for placing a ball on the board (since of the 75 possible balls, only 25 are placed). The number of fixed awards are pre-determined in this case, and the cost are also known, so funding for these non-progressing jackpots can be grouped into the overall base jackpot value for the mystery jackpot cycle.

FIG. 1B shows a similar game display board as FIG. 1A, except that the embodiment of FIG. 1B provides multiple mystery-bingo jackpots. This can be seen because several of the jackpots have a "must hit by" limit. It is noted that as each mystery-bingo jackpot is awarded, it will typically be deactivated until it is reset (such as at the end of a payout cycle). Various deactivation indicators, such as un-highlighting, or graying out the mystery-bingo jackpot may be used to signify it has already been awarded and not available for winning.

In some embodiments, a mystery-bingo jackpot may not be indicated as active until it can be won by the players. For example, when the mystery-bingo jackpot's value is between its lower limit and base value, the mystery-bingo jackpot continues to increment, but cannot be won. In this case, the system grays out or otherwise indicates that the mystery-bingo jackpot is not currently eligible to be won. When the mystery-bingo jackpot is eligible to be won, such as when its value increases to or beyond the lower limit, the mystery-bingo jackpot may be indicated as active.

In one embodiment, the controller 108 may allow the operator the option to group the bingo balls forming the game outcome of individual mystery-bingo jackpots together, thereby forcing the controller 108 to select all values associated with such balls under a pre-selected maximum threshold (i.e., upper limit) specific to that mystery-bingo jackpot. For example, in the case of our example, the controller 108 guarantees that all bingo balls forming the "cross" outcome may be placed on the global bingo card 120, before the upper limit of that jackpot reaches $2,000 dollars. The controller 108 may be configured to select random trigger values only in the range set by the lower and upper limit of that particular jackpot. In this way, the jackpot's winning outcome will occur before the upper limit is reached. Therefore, it is possible to place a "must hit by" indicator alongside each one of multiple mystery-bingo jackpots. It is contemplated that the controller 108 may accept multiple lower and upper limits during configuration to support multiple mystery-bingo jackpots.

In another embodiment, the controller 108 may make a fair placement (evenly distributed in terms of random distribution) of trigger values between the lower and upper limit of the largest of the mystery-bingo jackpots. Because the controller 108 also generates the global bingo card 120, and associates the bingo ball numbers to the trigger values beforehand, the controller can determine the actual "must hit by" value for each supported jackpot.

This value can be electronically transmitted for presentation alongside a mystery-bingo jackpot's award, such as on a display 104 and/or on individual gaming machines or devices. In other words, since the controller 108 pre-determines the trigger values and bingo ball number associations beforehand, it can also calculate, by inspection, the specific "must hit by" value for each mystery-bingo jackpot.

It is contemplated that the configuration mechanism or routine within the controller 108, may be configured to pre-select fair balls, trial by trial, until basic jackpot configuration parameters are satisfied. Stated another way, the controller 108 may repeatedly generate random distributions of trigger values and associated bingo ball numbers, until a preselected desired mystery-bingo jackpot is obtained. To illustrate further, in one exemplary embodiment, an operator may select a desired must hit by upper limit (or range of upper limits) and the controller 108 may repeatedly generate trigger values and associated bingo ball numbers until a mystery-bingo jackpot having such upper limit is successfully generated.

In another embodiment, multiple bingo cards may be shared among all players. Each of the shared bingo cards supports its own independent, shared ball draw. Each card supports its own lower and upper limit for which trigger values will be selected, and hence bingo ball numbers will be generated. Supporting a plurality of shared bingo cards allows each bingo card to support its own set of bonusing criteria, which is apart from any other card. Multiple global bingo cards can support their own separate ball draws, where the central bonus controller tracks the ball draw for each card separately and independently.

Further details regarding the operation of the mystery-bingo jackpot system will now be described with regard to the flow diagram of FIG. 3. In one or more embodiments, the operational process disclosed may be performed by the mystery-bingo jackpot controller, which may be a standalone controller, a gaming server, or a gaming machine or other gaming device.

At a step 304, a plurality of trigger values between a lower and upper limit may be randomly selected. As disclosed above for example, 75 trigger values may be randomly selected, though it is contemplated that various numbers of trigger values may be selected. In one or more embodiments, the number of trigger values may depend on the configuration of the global bingo card. For example, 75 trigger values may be sufficient to generate a winning outcome on a global bingo card of a 5×5 configuration (i.e., having 25 spots). Fewer or more trigger values may be randomly selected if the global bingo card has fewer or additional spots. This ensures a winning outcome before the upper limit is reached regardless of the number of spots on the global bingo card.

At a step 308, wager information may be received. Typically the wager information will indicate a wager or funding value. For example, the wager information may be the amount of a wager or a portion of the wager. This value may be used to increment a mystery-bingo jackpot. The wager information may be received from the base games associated with the mystery-bingo jackpot. For example, wager information may be generated at one or more gaming machines. The wager information may indicate the value of a wager or a portion thereof that has been received by a currency acceptor associated with the gaming machine.

If the value of the entire wager placed at the gaming machine is received, the controller may determine how much of the wager to use to increment the mystery-bingo jackpot. Alternatively, the gaming machines may determine this and generate wager information indicating the portion of the wager to be used to increment the mystery-bingo jackpot. The amount of a wager to be used to increment the mystery-bingo jackpot may be defined by an increment rate. This may be defined as a percentage of each wager for example. It is noted that some or all of every wager may be used to increment the mystery-bingo jackpot, regardless of its size. In this manner, every player that makes a wager qualifies for the mystery-bingo jackpot.

In some embodiments however, only wagers of at least a particular threshold value may qualify the player for the mystery-bingo jackpot. Unqualified wagers would not increment the mystery-bingo jackpot and thus would not trigger a bingo ball draw. Other options for qualifying for a chance at triggering a ball draw event for each include 1) making increasingly larger, or eligible wagers on the underlying game, and 2) buying opportunities via a side wager bet, and 3) winning bingo card opportunities during a bonus round.

At a step 312, the mystery-bingo jackpot may be incremented based on or with the value provided in the wager information. At a decision step 316, it may be determined if this increase to the mystery-bingo jackpot has caused the value of the jackpot to reach (i.e., equal) one of the trigger values. If not, the controller may return to step 308 to receive additional wager information. If a trigger value has been reached (or exceeded in some embodiments), then a bingo ball draw may be conducted at a step 320.

The bingo ball draw may occur in various ways. In some embodiments, bingo ball numbers may have been previously randomly associated with each trigger value. In such embodiments, the bingo ball draw may occur by simply accessing or reading the trigger value's associated bingo ball number. In other embodiments, an actual physical or an electronic bingo ball draw may occur, such as by randomly selecting a bingo ball from a pool of bingo balls. Typically, the selected bingo ball will be removed from the pool so that it may not be selected again. If a physical bingo ball draw is used, the apparatus used or such draw may comprise an electronic interface or reporting which bingo ball has been selected, such as by transmitting the number of the selected bingo ball. Alternatively, an operator may read the number from the selected bingo ball and input the number into the controller.

At a step 324, the status of the global bingo card may be updated by marking any spot or spots on the global bingo card having a number that matches the selected bingo ball. For example, if the selected bingo ball is numbered "B37", any spots labeled "B37" may be marked on the global bingo card. In this way the selected bingo ball number is included or incorporated into the global bingo card.

At a decision step 328, it may be determined if the updated global bingo card now has a winning outcome. In general, this will occur by comparing the current state of the global bingo card to the predefined winning outcomes of the mystery-bingo jackpot. Referring to FIG. 1 for example, the winning outcomes include specific patterns of markings on the global bingo card, such as full coverage, a cross, four corners, any line (horizontal, vertical, or diagonal), and/or any placed or matching bingo ball. Various other winning outcomes may be defined as well.

If the global bingo card has marked spots that match a winning outcome, a winning outcome has occurred. If not, a winning outcome has not occurred and the process may return to step 308, where additional wager information may be received as players continue to play the mystery-bingo jackpot's base games.

A winning outcome may be paid out at a step 332. The controller may transmit a signal to the winning player's gaming machine to indicate that the player has won the mystery-bingo jackpot, and to payout the corresponding currency or credits. The player's gaming machine may issue payment electronically, via a coin dispenser or ticket printer, or other payout mechanism. Payment or payout could also be in the form of a prize. It is contemplated that a notification or alert may also be emitted from a public display of the mystery-jackpot controller. Such notification may include one or more audio and/or visual elements.

Once a payout has been made, it may be determined at a decision step 336, whether or not to reset the mystery-bingo jackpot. In general, resetting the mystery-bingo jackpot results in setting the jackpot award to a base value, which may but need not be zero. This may occur at step 340.

In embodiments having a single mystery-bingo jackpot (i.e., a single upper limit), the mystery-bingo jackpot may be reset each time it is won. It is noted that decision step 336 may not be provided in such embodiments. In embodiments having multiple mystery-bingo jackpot awards (i.e., multiple upper limits), the mystery-bingo jackpot need not be reset after each win. For example, multiple upper limits may be set. The mystery-bingo jackpot may not be reset until an award associated with the largest of the upper limits is won thus completing a bonus cycle. Once reset, a new set of trigger values 304 may be randomly selected at step 304.

It is noted that determination of winning outcomes for other jackpots, such as progressive or fixed jackpots may also occur. For example, at decision step 328, the global bingo card may be compared to winning outcomes for these other jackpots. If a winning outcome has occurred, the award for these jackpots may be paid out at step 332 as well.

Figure 4:
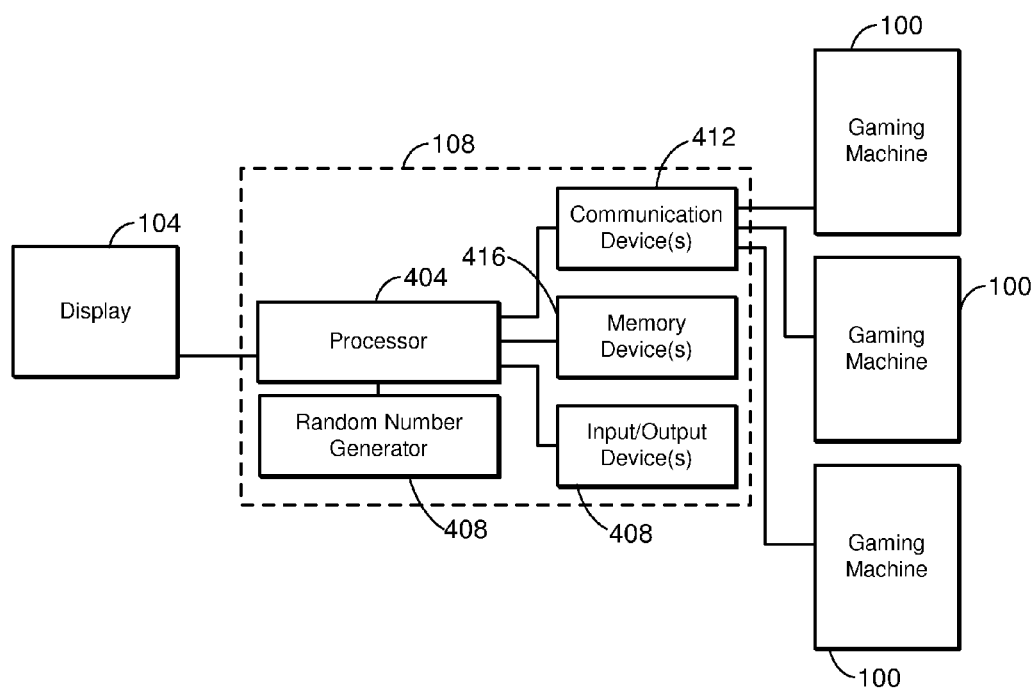
FIG. 4 is a block diagram illustrating an exemplary mystery-bingo jackpot controller.

FIG. 4 is a block diagram illustrating an exemplary controller 108 for the mystery-bingo jackpot. As stated, the controller 108 may be a standalone controller, or be implemented via a gaming server, gaming machine, or other gaming device. As can be seen, the controller 108 may comprise a processor 404 configured to execute various instructions to provide the functionality disclosed herein. In one or more embodiments, the processor 404 may execute instructions in the form of machine readable code. Such machine readable code may define operation of the controller. The machine readable code may be stored on a memory device 416 or other data storage device, be hardwired into the processor 404, or both. In one or more embodiments, the processor 404 may be an integrated circuit, microprocessor, or the like. Multiple processors 404 may be used for various tasks, to increase speed, or for redundancy in some embodiments.

For example, in an exemplary circumstance, an operator may input configuration and other information to customize the progressive layout by selecting the desired winning outcomes. The display and system is thus responsive to the operator's desire to add or modify the various winning outcomes upon initial configuration. This provides a jackpot that the operator may customize as desired, such as to entice players. In addition, the inputted winning outcomes may be retrieved or otherwise used when the mystery-bingo jackpot is reset (such as when a jackpot is won). For example, inputted winning outcomes may be the winning outcomes presented on the system's display (upon initial configuration or after a reset) so that players can play to achieve these outcomes to win a jackpot payout.

In operation, the processor 404 may accept input, such as configuration settings, wager information, and other information, process the input and provide an output. The output may be some or all the information presented on a display 104. For example, the status of the global bingo card, jackpot award amounts, or other information may be outputs.

It is contemplated that the controller 108 may have one or more memory devices 416. In addition or instead of storing machine readable code, it is noted that a memory device 416 may store various information related to the mystery-bingo jackpot. For example, a memory device 416 may store lower and upper limits, base values, the current value of a mystery-bingo jackpot, and/or one or more triggering values. In addition, a memory device 416 may store selected and unselected bingo ball numbers. Wager information could also be stored. Various memory devices 416 may be used. For example, a memory device 416 may be RAM, flash memory, ROM, magnetic media, optical media or other storage technology.

The controller 108 may also include one or more communications devices 412 or communicating with external and/or remote devices, such as the gaming machines 100 shown in FIG. 4. It is contemplated that a communication device 412 may communicate via a wired or wireless connection. In one or more embodiments, wager information may be shared between the gaming machines 100 and the controller 108 via a communication device 412. In addition, it is contemplated that a communication device 416 may be used to configure the controller with an external device, such as described above. The controller 108 could also or alternatively have one or more input/output devices to allow users to interact with the controller, such s to configure the controller.

One or more random number generators 408 may be included as well. A random number generator 408 may be used to select trigger values and/or bingo balls randomly. In embodiments configured to do so, a random number generator 408 may randomly associate bingo ball numbers with the trigger values. It is noted that the random number generator 408 may be a separate component or may be built in to another component, such as the processor 404. In some embodiments, the random number generator 408 may be external and remote from the controller 108. For example, random numbers (or the trigger values and bingo ball numbers themselves) may be supplied by an external device, such as a gaming server or a physical bingo ball draw apparatus 116.

Many variations are possible with the systems and methods disclosed herein. In one variation, a plurality of global bingo cards may be displayed, each associated with its own award. Options for qualifying for a chance at triggering a ball draw event for each bingo card include 1) making increasingly larger, or eligible wagers on the underlying game, and 2) buying opportunities via a side wager bet, and 3) winning bingo card opportunities during a bonus round.

Alternatively, a plurality of mystery-bingo jackpot pools may each be associated with a specific winning outcome on one global bingo card. For instance, a horizontal straight line outcome may be paid from one funding pool, while a four corner square pattern may pay from another funding pool. In one embodiment, all bingo balls may be made available until the end of a mystery award cycle, such that bingo balls used to complete a less probable winning outcome will persist and be available to complete another less probable winning outcome. This is highly advantageous, since the largest mystery-bingo jackpots tend to be associated with the least probable winning outcomes, and such outcomes are more likely, even guaranteed, to occur at or near the end of a bonus cycle. It can be expected however that the mystery-bingo jackpots will be generally awarded in order, from smallest to largest during a bonus cycle.

In one embodiment, each mystery-bingo jackpot may be associated with its own increment rate setting. Furthermore, mystery-bingo jackpot payouts may be triggered using one shared set of trigger values (each associated with a ball draw), or each mystery-bingo jackpot may employ its own set of trigger values and associated bingo ball draws. In the case of using a shared set of balls, a single shared configuration of base value, low limit and high limit may be used to establish an overall bonus game cycle. In the case of using separate balls sets (i.e. separate secret values) for each jackpot or subset of jackpots, a separate set of configuration settings may be used for each jackpot or subset of jackpots. In this latter case, each jackpot pool will generally provide its own bonus game cycle.

In another embodiment, the jackpot need not be based on bingo, but may be based on some other game, such as five card poker. For example, a 52 card deck can be represented using 52 trigger values arranged between a lower limit and an upper limit. In one embodiment, these trigger values are randomly selected, using a randomizing element with even probability of distribution within that range. Jackpot values are assigned to common five card poker outcomes, such as straight, flush, four of a kind, royal flush, etc. As the trigger values are encountered as the jackpot value increases, the associated cards are displayed on a public display. The person obtaining the card which completes the first occurrence of a winning hand, wins that jackpot. For example, the first player to draw a card which completes a royal flush may win the largest jackpot. Similar to a bingo ball draw, a card draw may occur when a player's wager increments the jackpot value to equal or exceed a trigger value. It is contemplated that a player may be offered the chance to randomly select the card from a plurality of symbols.

In another playing card or poker embodiment, each jackpot pool may contain its own set of trigger values, each associated with a card, or other indices. A wager pushing the jackpot value to meet or exceed the trigger value causes the system to award the player a card draw. In this embodiment, the card draw is specific to a particular winning hand. If a drawn card completes a winning poker hand, the jackpot may be awarded. Otherwise, the card remains with the group of previously drawn cards until a winner is determined. The system may be seeded with some "starting" cards to maintain player interest at the beginning of the bonus cycle.

In another embodiment, all cards may be global, and may be applied to any jackpot type, or poker game outcome. In this case, previously drawn cards are continuously in display and remain in play. When a player draws a card which completes a winning hand, those cards may be removed from the display. In this manner, the least likely game outcomes remain least likely and the most likely game outcomes occur first on average. The system also ensures that enough cards are preselected at the beginning of the bonus game cycle to cover all game outcomes associated with pending jackpots. In this embodiment, fixed awards can be given to smaller poker hand outcomes.

In one embodiment, the system regulates the number of awards and the number of card draws in such a manner as to ensure the eventual outcome of each jackpot. In another embodiment, any non-winning jackpots, i.e., associated to non occurring poker hands, are saved and added into the associated jackpot for the next bonus cycle. In this case, the "must hit by" value is generated by the system considers the new higher starting value.

In one embodiment, a special set of trigger values are randomly selected along the range; likewise, a specific card is associated to each trigger value. In this case, not all 52 cards may be represented; however, a set of cards is pre-selected which will not interfere with the probability of another poker hand outcome. For example, the cards for a straight and a flush are defined and preselected; the cards have been selected so they cannot coincide to create any other outcome than the two intended outcomes.

As disclosed in the introductory paragraphs above, in some embodiments of the mystery-bingo jackpot, a "must hit by" value need not be provided. This permits a payout amount to increase virtually without limit until it is awarded. In such embodiments, the mystery-bingo jackpot will typically provide increased payout opportunities in lieu of a "must hit by" value.

It can thus be seen that the mystery-bingo jackpot can serve various player preferences by offering a first gaming experience with "must hit by" values to players who desire it and offering a second gaming experience with increased payout opportunities to other players. It is noted that these gaming experiences will typically be offered separately, such as through separate mystery-bingo jackpot systems.

Figure 5:
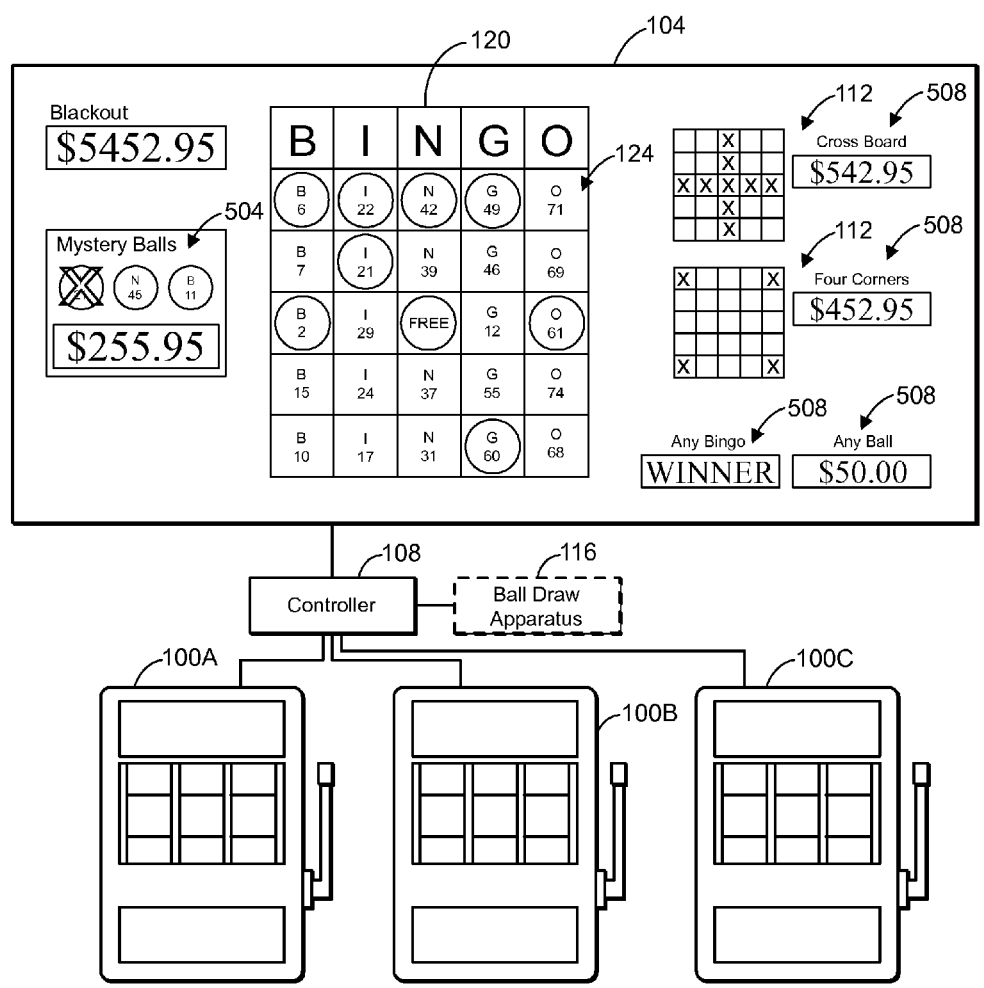
FIG. 5 is a block diagram illustrating an exemplary mystery-bingo jackpot system.

To illustrate, FIG. 5 shows an exemplary display for a mystery-bingo jackpot with increased payout opportunities. As can be seen, the display 104 may be a large-format display such that its information is readily visible to a plurality of players. The display 104 may present a global bingo card 120 along with primary winning outcomes 508 and representative bingo cards 112 that graphically illustrate the bingo balls required to achieve the primary winning outcomes. It is noted that a paytable or other presentation of winning outcomes could be used instead of the representative bingo cards 112. A payout amount may be presented along with each primary winning outcome 508, such as shown.

The display 104 may also present one or more secondary winning outcomes 504 comprising one or more bingo balls. Typically, the secondary winning outcomes 504 will have distinct characteristics as compared to the primary winning outcomes 508. For example, a secondary winning outcome 504 may contain a different set of bingo balls than any of the primary winning outcomes 508. In one or more embodiments, the primary winning outcomes 508 may be the traditional winning outcomes for bingo games (e.g., a filled row, filled column, diagonal, cross, four corners, blackout, etc. . . . ).

A secondary winning outcome 504 may also or alternatively be distinguished from primary winning outcomes by the number of bingo balls it contains. In a typical embodiment, a secondary winning outcome 504 will comprise fewer bingo balls than any of the primary winning outcomes 508. This is shown in FIG. 5 where the secondary winning outcome 504 consists of a three ball combination, whereas the primary winning outcomes 508 consist of four or more bingo balls.

A fewer number of bingo balls is advantageous in that it increases the frequency at which a secondary winning outcome 504 may be achieved and awarded. This allows the mystery-bingo jackpot to increase payout frequency, and entices players and encourages play at a wagering game offering the mystery-bingo jackpot. In addition, as will be described below, these payouts typically do not reset awards for primary winning outcomes 508 thereby allowing awards for primary winning outcomes to continue increasing, further enticing and encouraging players to play.

A primary winning outcome 508 or secondary winning outcome 504 in a mystery-bingo jackpot with increased payout opportunities may be triggered in various ways. In one or more embodiments, a random number generator of a mystery jackpot controller may be configured to randomly generate bingo ball numbers for example. Alternatively, it is contemplated that bingo balls may be randomly selected by a mechanical apparatus such as a ball draw apparatus 116 comprising actual bingo balls.

It is contemplated that the display 104 may comprise one or more animated characters or animatronic devices for presenting various occurrences or events of the mystery-bingo jackpot. The character may key off different states of the mystery-bingo jackpot, and then provide enticing sound scripting as a result. For example, the character may say in an animated fashion "Only one more ball I need to win", or "If I get ball B3, I'll be a two times Bingo winner!"

Figure 6:
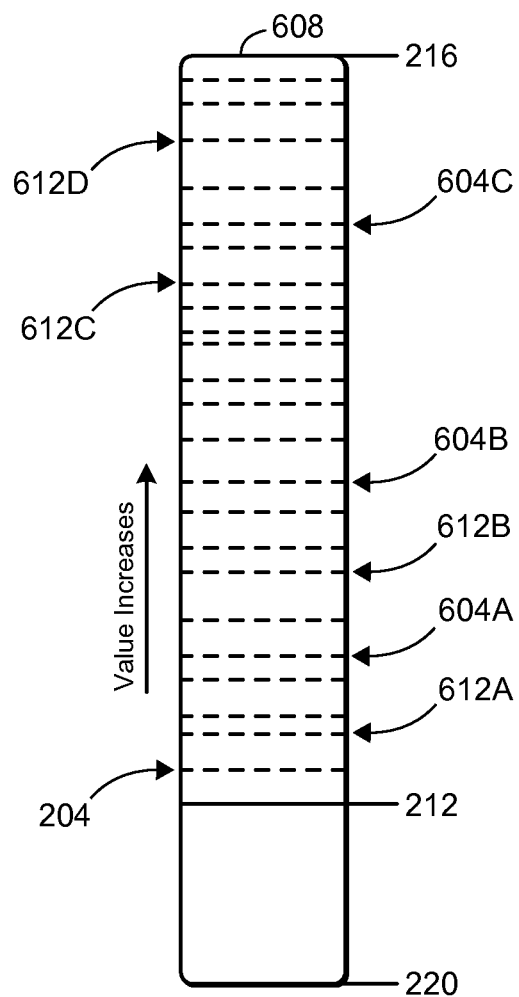
FIG. 6 is a block diagram illustrating an exemplary mystery-bingo jackpot.

Referring to FIG. 6, it can be seen that bingo ball draws may alternatively be accomplished by a trigger value mechanism, similar to those described above with regard to FIGS. 2A-2B. FIG. 6 illustrates an exemplary mystery-bingo jackpot 608 as a vertical bar having a plurality of preselected trigger values 204 (shown by the dashed lines) placed between a lower limit 212 and an upper limit 216. A base value 220 that defines a starting or initial value of a mystery-bingo jackpot award may be provided as well.

A random number generator may be used to select the trigger values 204 between the lower and upper limit 212, 216, and a bingo ball number may be randomly selected for associated with each trigger value. It is contemplated that the upper limits 216 may, but need not, be used ensure that at least one secondary winning outcome and/or primary winning outcome occur before the mystery-bingo jackpot 608 reaches the upper limit 216.

The exemplary embodiment of FIG. 6 also shows trigger values 604 corresponding to an exemplary secondary winning outcome, and trigger values 612 corresponding to an exemplary primary winning outcome. In operation, these trigger values 604, 612 may be reached as the value of the primary winning outcome's award is incremented. Once all trigger values corresponding to a primary or secondary winning outcome are reached, their corresponding bingo balls are considered drawn and the primary or secondary winning outcome is achieved.

As shown, the last trigger value 604C for the secondary winning outcome occurs is positioned before the last trigger value 608C for the primary winning outcome. In this example then, the secondary winning outcome would occur before the primary winning outcome. Thus, as can be seen, one or more payouts for achievement of a secondary winning outcome can be made while players are pursuing a primary winning outcome (again without resetting the value of the primary winning outcome). It is noted that the last trigger value of a primary and secondary winning outcome could be the same thus triggering an award for both outcomes simultaneously.

Figure 7A:
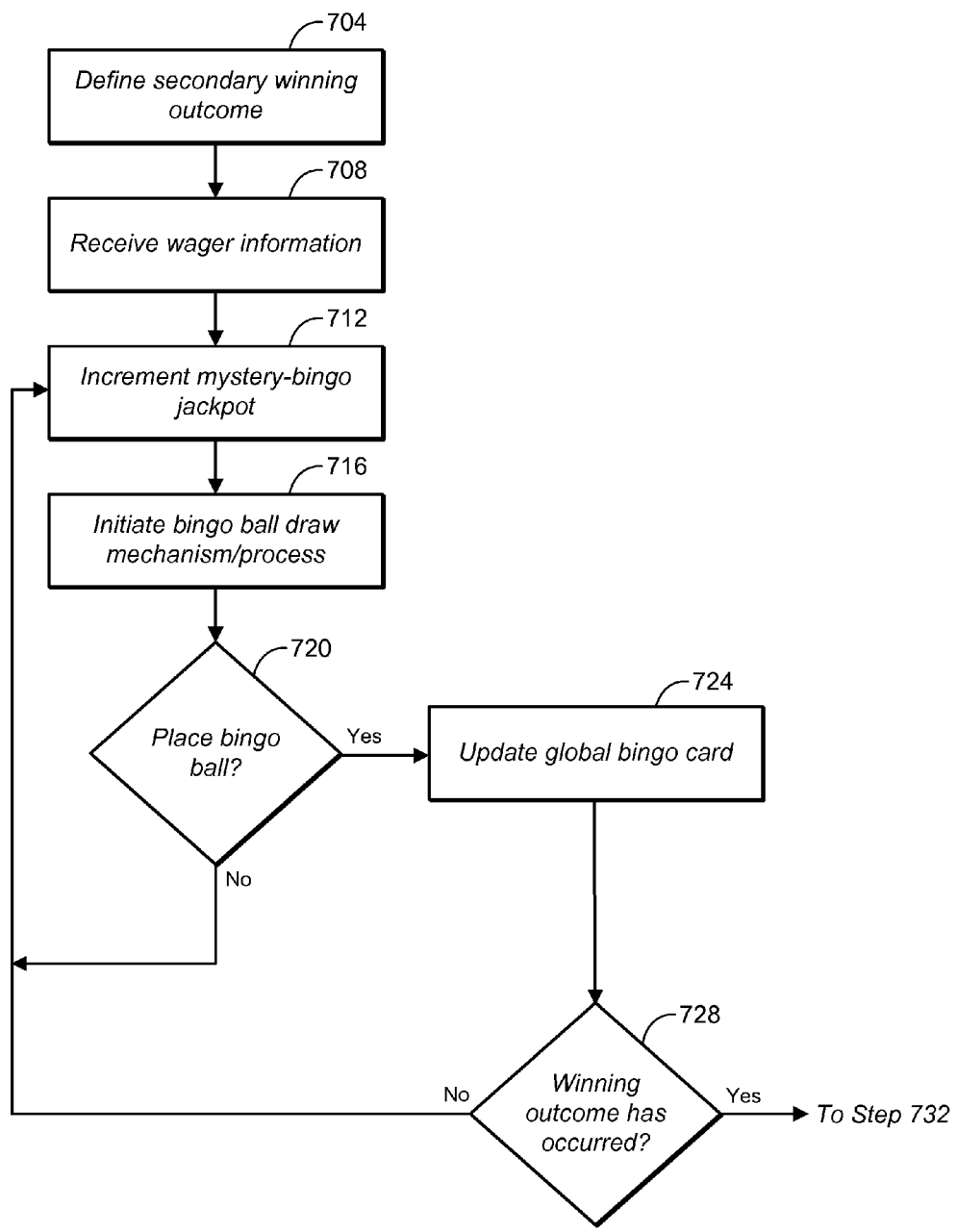
FIG. 7A is a flow diagram illustrating operation of an exemplary mystery-bingo jackpot system.
Figure 7B:
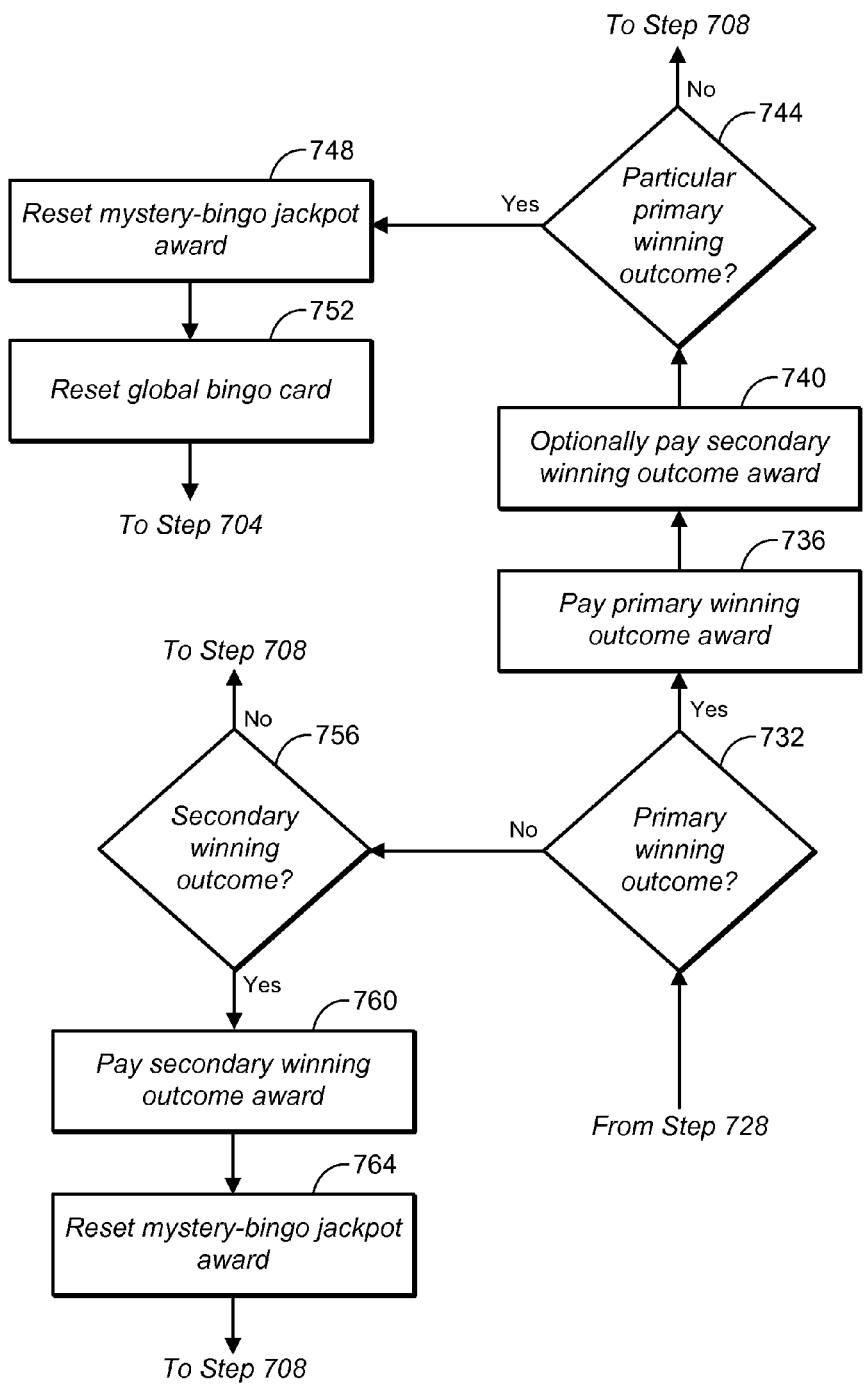
FIG. 7B is a flow diagram illustrating operation of an exemplary mystery-bingo jackpot system.

The flow diagram of FIGS. 7A-7B illustrates operation of an exemplary embodiment of the mystery-bingo jackpot with increased payout opportunities. In the following process, players are provided payouts for achievement of secondary winning outcomes. As stated above, secondary winning outcomes will typically be achieved more frequently than primary winning outcomes (because secondary winning outcomes typically contain fewer bingo balls). In addition, achievement of a secondary winning outcome will typically not reset the awards for primary winning outcomes. In this manner, awards for the primary winning outcomes can continue to increase even as one or more secondary winning outcomes are paid out.

Because of this continuing increase a "must hit by" value for primary winning outcomes may no longer be reliably predicted and presented. However, the use of one or more secondary winning outcomes allows the mystery-bingo jackpot to make payouts with increased frequency to entice players, encourage play, and increase excitement for wagering games utilizing the mystery-bingo jackpot.

Referring to FIG. 7A, at a step 704, a secondary winning outcome may be defined, such as by selecting one or more bingo balls that will form the secondary winning outcome. This may occur in various ways. For example, in one embodiment, the secondary winning outcome may be selected from predefined sets of bingo balls. In another embodiment, a randomly selected set of bingo balls may form the secondary winning outcome. It is noted that multiple secondary winning outcomes may be defined in some embodiments.

At a step 708, wager information may be received. The receipt of wager information may initiate various actions at the mystery-bingo jackpot. As described above for instance, the wager information may be used to determine an amount by which the mystery-bingo jackpot should be incremented. The mystery-bingo jackpot may then be incremented accordingly at a step 712. In addition, the receipt of wager information may cause a bingo ball draw to occur, such as shown at a step 716. As stated, the bingo ball draw may occur by using a random number generator to select or generate a random bingo ball. Alternatively, a ball draw apparatus or a trigger value mechanism may be used to draw a bingo ball.

Typically, wager information will be received from one or more base games. It is contemplated that a base game may be configured only to transmit wager information if particular criteria are met. In this manner, the base game can control when a bingo ball draw occurs. For example, a base game may be configured to transmit wager information to the mystery-bingo jackpot only when a particular outcome is achieved. Such a base game would randomly activate bingo ball draws in this manner.

At a decision step 720 it may be determined if the drawn ball has a matching box on the global bingo card. If so, the global bingo card may then be updated at a step 724 to include the drawn bingo ball (if present on the global bingo card). In embodiments configured to present a global bingo card, the updated global bingo card may be presented to players, such as via a display as described with regard to FIG. 5.

At a decision step 728, it may be determined if a winning outcome has occurred, such as by determining if the updated global bingo card contains any primary or secondary winning outcomes. If no winning outcome has occurred, the process may return to step 708 to await receipt of further wager information to increment the mystery-bingo jackpot.

If a winning outcome has occurred at decision step 728, then the type of winning outcome that occurred may be determined. Different procedures may be followed depending on whether a primary winning outcome, secondary winning outcome, or both have occurred. For example and as will be detailed in the following, the mystery-bingo jackpot may reset the global bingo card, trigger values, primary winning outcome awards, secondary winning outcomes, or various combinations thereof depending on the type of winning outcome that has occurred.

Referring to FIG. 7B, at a decision step 732, if the winning outcome is a primary winning outcome, its associated award may be paid out at a step 736. At a step 740, it may be determined if a secondary winning outcome has also occurred as a result of the bingo ball draw. If so, the award for the secondary winning outcome may be paid at step 740. It is contemplated that the payout of a primary and secondary winning outcome may be made in one payment to a player that has achieved the same.

At a decision step 744, the winning outcome may be evaluated to determine if it is a particular primary winning outcome. Typically, a particular primary winning outcome will be one of the mystery-bingo jackpot's primary winning outcomes specifically identified or selected to be a particular primary winning outcome. For example, the particular primary winning outcome may be a blackout, cross, four corners or other primary winning outcome. It is noted however, that in one exemplary embodiment of the mystery-bingo jackpot, a particular secondary winning outcome could be used in addition or instead of a particular primary winning outcome for evaluation at decision step 744.

If the primary winning outcome is not a particular primary winning outcome, the process may continue at step 708 where additional wager information may be received. If the winning outcome is a particular primary winning outcome, the mystery-bingo jackpot's primary winning outcomes may be reset (e.g., set to their respective base values or to zero) at a step 748. The global bingo card may be reset at a step 752. Typically, a reset of the global bingo card will empty the global bingo card. Alternatively, one or more spots on the global bingo card may be marked as part of a reset in some embodiments.

The combination of steps 748 and 752 is considered to be a restart of the mystery-bingo jackpot. The process may then return to step 704 where a new secondary winning outcome may be defined for the restarted mystery-bingo jackpot. It is contemplated that in some embodiments, the same secondary winning outcome may be used. In such case, the process may return to step 708 to await receipt of wager information.

Referring back to decision step 732, if the winning outcome not a primary winning outcome, it is still possible that a secondary winning outcome has been achieved. Such determination may be made at a step 756, and if a secondary winning outcome has been achieved, its award may accordingly be paid out at a step 760.

Awards for one or more primary winning outcomes may then be reset at a step 764. Typically, the reset will lower the value of a payout for one or more primary winning outcomes, such as to a predefined base value or zero as described above with regard to step 748. In one exemplary embodiment, a reset may occur by lowering the amount of a payout for a primary winning outcome in some embodiments. This lowering may be divided between multiple primary winning outcome awards.

The process may then return to step 708 to await receipt of additional wager information. It is contemplated that a new secondary winning outcome may also be generated if a secondary winning outcome has been achieved at step 756. Alternatively, the secondary winning outcome may remain constant until the mystery-bingo jackpot is restarted. As can be seen from FIG. 7B, the process also returns to step 708 if a secondary winning outcome has not occurred at step 756.

In embodiments utilizing a trigger value system, it is noted that new trigger values may be generated after payout of a secondary award occurs at step 740, step 756, or both. FIG. 8 illustrates the selection of new trigger values at an exemplary mystery-bingo jackpot 608. As shown, the mystery-bingo jackpot 608 has an initial lower limit 212A and upper limit 216A defining an initial range 804A from which a first set of trigger values may be been selected. After a secondary winning outcome awarded, new trigger values may be selected from a new range 804B having a new lower limit 212B and upper limit 216B. As can be seen, the new lower limit 212B and upper limit 216B may be larger relative to the original lower limit 212A and upper limit 216A. The new trigger values selected from the new range 804B thus have a higher upper limit. This allows the mystery-bingo jackpot's awards to increment beyond the initial range 804A, thus offering higher payouts even after a secondary winning outcome has been paid.

Though shown as disjoint ranges, it is contemplated that a subsequent range from which trigger values may be selected might overlap its initial or preceding range in some situations. For example, the new range 804A may have a lower limit 212B at or above the trigger value that completes a secondary winning outcome (that falls within the upper limit of the first range 804A). It is also contemplated that the new range 804B may start at a predefined or randomly selected offset from the first range 804A or other preceding range. In this manner, the occurrence of a secondary winning outcome can increase the mystery-bingo jackpot by a predefined amount.

It is contemplated that, in one or more embodiments, only bingo balls that have not been previously drawn may be associated with the new trigger values in the new range 804B. In this manner, the bingo game of the mystery-bingo jackpot can continue without causing previously drawn bingo balls to be drawn again.

In one or more embodiments, various characteristics of the secondary winning outcome may be received, such as at a controller of the mystery-bingo jackpot, from an administrator or other gaming establishment personnel. This allows the mystery-bingo jackpot to be configured or customized. For example, an administrator might select the number of bingo balls in the secondary winning outcome. This would change the likelihood or hit rate of the secondary winning outcome. Since, occurrences of the secondary winning outcome can change or raise the upper limit of the mystery-bingo jackpot, altering the hit rate of the secondary winning outcome has an effect of the overall mystery-bingo jackpot as well.

It is contemplated that the mystery-bingo jackpot controller (or other computing device) may be configured to determine and present the resulting effect that changes to a secondary winning outcome would cause. For example, the controller may determine statistics showing the rate at which a secondary winning would occur if the number of bingo balls in the secondary winning outcome is altered. This information may then be presented via an output device, such as a display screen, or be transmitted to another device for presentation.

The controller may also or alternatively determine and present statistics showing the mean or median amount at which primary winning outcomes would occur based on the number of bingo balls in the secondary winning outcome. This is helpful to gaming establishments in determining how they might configure the secondary winning outcome, especially when considering that the use of secondary winning outcomes as disclosed herein renders prediction of a "must hit by" value difficult if not impossible.

This statistical information about the mystery-bingo jackpot for one or more proposed secondary winning outcomes may be presented in various ways. To illustrate, the mean or median amount at which one or more particular primary winning outcomes are paid out for a given number of games (which the administrator may specify) may be presented in a chart, graph, table or the like. As another example, the rate at which one or more particular primary winning outcomes occur for a given secondary winning outcome may be presented. Once the administrator arrives at an acceptable secondary winning outcome configuration for his or her gaming establishment, it may be inputted into the controller for use during operation of the mystery-bingo jackpot. For example, if the administrator selects a mystery-bingo jackpot having a secondary winning outcome consisting of two bingo balls, the same may be inputted into the controller to accordingly govern operation of the mystery-bingo jackpot.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A mystery-bingo jackpot controller comprising:
   one or more storage devices storing:
      a plurality of primary winning outcomes associated with a primary award amount and comprising at least a number of bingo balls, wherein one of the primary winning outcomes is identified as a particular primary winning outcome;
      a secondary winning outcome associated with a secondary award amount and having fewer than the number of bingo balls; and
      a range having a lower limit and an upper limit;
   one or more random number generators configured to generate a plurality of trigger values within the range; and
   one or more processors configured to:
      increment the primary award amounts a particular amount;
      update a global bingo card with a random bingo ball number when at least one primary award amount meets or exceeds one of the plurality of trigger values;
      compare the updated global bingo card to the plurality of primary winning outcomes including the particular primary winning outcome, and to the secondary winning outcome;
      initiate a payout when the updated global bingo card contains at least one of the plurality of primary winning outcomes or the secondary winning outcome; and
      adjust the range upward only when the updated global bingo card contains the secondary winning outcome; and
      reset the plurality of primary award amounts to a base value only when the updated global bingo card contains at least one of the plurality of particular primary winning outcomes;
   wherein one or more new trigger values are generated within the adjusted range by the one or more random number generators after the range is adjusted upward.

2. The mystery-bingo jackpot controller of claim 1, wherein the one or more processors adjust the range upward by increasing at least a lower limit of the range.

3. The mystery-bingo jackpot controller of claim 1, wherein the one or more processors adjust the range upward by increasing an upper limit of the range.

4. The mystery-bingo jackpot controller of claim 1, wherein the one or more processors pay both a primary award amount and the secondary award amount when the updated global bingo card contains at least one of the plurality of primary winning outcomes and the secondary winning outcome.

5. The mystery-bingo jackpot controller of claim 1 further comprising one or more communication devices configured to receive wager information from one or more base games on a plurality of gaming machines, the wager information indicating the particular amount to increment the jackpot award amount.

6. The mystery-bingo jackpot controller of claim 1, wherein a bingo ball number is associated with each of the plurality of trigger values, and the drawn bingo ball number is the bingo ball number associated with the one of the plurality of trigger values that is met or exceeded.

7. The mystery-bingo jackpot controller of claim 1 further comprising a large-format display configured to present at least the global bingo card to a plurality of players.

8. A mystery-bingo jackpot controller comprising:
a plurality of primary winning outcomes comprising a plurality of bingo ball numbers, each of the plurality of primary winning outcomes having an associated primary winning amount, wherein at least one of the primary winning outcomes is identified as a particular primary winning outcome;
one or more secondary winning outcomes comprising one or more bingo ball numbers, each of the one or more secondary winning outcomes having an associated secondary winning amount, the one or more secondary winning outcomes being distinct from the plurality of primary winning outcomes;
one or more random number generators configured to generate a plurality of bingo ball numbers; and
one or more processors configured to:
increment at least one of the primary winning amounts a particular amount according to one or more increment rates;
update a global bingo card with a bingo ball number from the one or more random number generators;
initiate payout of a primary winning amount when the updated global bingo card contains at least one of the plurality of primary winning outcomes, wherein the plurality of primary award amounts are reset to a base value when the updated global card contains the at least one particular primary winning outcome; and
initiate payout of the secondary winning amount when the updated global bingo card contains at least one of the one or more secondary winning outcomes.

9. The mystery-bingo jackpot system of claim 8, wherein the one or more secondary winning outcomes have fewer bingo balls than the plurality of primary winning outcomes.

10. The mystery-bingo jackpot system of claim 8 further comprising one or more communication devices configured to receive wager information from one or more base games played on a plurality of gaming machines, the wager information indicating the particular amount to increment the jackpot award amount.

11. The mystery-bingo jackpot system of claim 8, wherein the one or more secondary winning amounts are constant.

12. The mystery-bingo jackpot controller of claim 8, wherein the plurality of bingo balls in the one or more secondary winning outcomes are randomly selected by the one or more random number generators.

13. The mystery-bingo jackpot controller of claim 8, wherein the number of bingo balls in the one or more secondary winning outcomes is adjustable via one or more input devices.

14. The mystery-bingo jackpot controller of claim 12, wherein the one or more processors are configured to determine an estimated payout amount for each of the plurality of primary winning outcomes based on the number of bingo balls.

15. The mystery-bingo jackpot controller of claim 8 further comprising a large-format display configured to present the global bingo card and the one or more secondary winning outcomes to a plurality of players.

16. A method for awarding a jackpot with a mystery-bingo jackpot controller comprising:
defining a secondary winning outcome comprising one or more bingo ball numbers, wherein the secondary winning outcome is distinct from a plurality of primary winning outcomes of the jackpot;
receiving wager information via a communication device in communication with one or more base games on a plurality of gaming machines, the wager information identifying an increment value;
incrementing at least one jackpot award associated with at least one of the plurality of primary winning outcomes by the increment value;
marking a randomly obtained bingo ball number on a global bingo card;
initiating a payout when the global bingo card contains at least one of plurality of primary winning outcomes, the secondary winning outcome, or both; and
resetting the at least one jackpot award to a base value and clearing the global bingo card when the global bingo card contains a particular predefined outcome, the particular predefined outcome being one of the plurality of primary winning outcomes.

17. The method of claim 16, wherein the secondary winning outcome has fewer bingo balls as compared to the plurality of primary winning outcomes.

18. The method of claim 17, wherein a number of bingo ball numbers in the secondary winning outcome is adjustable via an input device of the mystery jackpot controller.

19. The method of claim 16, wherein the secondary winning outcome is user-defined.

20. The method of claim 16 further comprising presenting the global bingo card to a plurality of players via a large-format display.

* * * * *